United States Patent [19]
Kim

[11] Patent Number: 6,094,636
[45] Date of Patent: Jul. 25, 2000

[54] SCALABLE AUDIO CODING/DECODING METHOD AND APPARATUS

[75] Inventor: Yeon-bae Kim, Suwon, Rep. of Korea

[73] Assignee: Samsung Electronics, Co., Ltd., Suwon, Rep. of Korea

[21] Appl. No.: 08/979,175

[22] Filed: Nov. 26, 1997

[30] Foreign Application Priority Data

Apr. 2, 1997 [KR] Rep. of Korea ............... 97-12233
Nov. 19, 1997 [KR] Rep. of Korea ............... 97-61300

[51] Int. Cl.$^7$ ............................................. G10L 19/00
[52] U.S. Cl. ................ 704/500; 704/229; 704/230
[58] Field of Search ................................. 704/205, 206, 704/207, 229, 230, 500–504

[56] References Cited

U.S. PATENT DOCUMENTS

| | | | |
|---|---|---|---|
| 5,109,417 | 4/1992 | Fielder et al. | 704/205 |
| 5,327,520 | 7/1994 | Chen . | |
| 5,357,594 | 10/1994 | Fielder . | |
| 5,495,298 | 2/1996 | Uchida et al. . | |
| 5,511,094 | 4/1996 | Lee et al. | 704/205 X |
| 5,613,035 | 3/1997 | Kim . | |
| 5,617,145 | 4/1997 | Huang et al. . | |
| 5,621,660 | 4/1997 | Chaddha et al. . | |
| 5,621,856 | 4/1997 | Akagiri . | |
| 5,627,937 | 5/1997 | Kim . | |
| 5,642,111 | 6/1997 | Akagiri . | |
| 5,664,056 | 9/1997 | Akagiri . | |
| 5,696,876 | 12/1997 | Lee . | |
| 5,734,657 | 3/1998 | Kim . | |
| 5,737,720 | 4/1998 | Miyamori et al. . | |
| 5,737,721 | 4/1998 | Kwon . | |
| 5,752,225 | 5/1998 | Fielder . | |
| 5,758,315 | 5/1998 | Mori . | |
| 5,761,636 | 6/1998 | Bolton et al. . | |
| 5,784,533 | 7/1998 | Van de Kerkhof et al. . | |
| 5,794,179 | 8/1998 | Yamabe . | |
| 5,809,474 | 9/1998 | Park . | |

OTHER PUBLICATIONS

B Grill et al., ISO/IEC JTCI/SC 29/WG11 MPEG 95/0426, University of Erangen, FhG–IIS, Oct. 1995.
Davis Pan, Motorola, "A Tutorial on MPEG/Auddio Compression," *IEEE MultiMedia*, vol. 2, Issue 2, Summer 1995, pp. 60–74.

*Primary Examiner*—David R. Hudspeth
*Assistant Examiner*—Abul K. Azad
*Attorney, Agent, or Firm*—Burns, Doane, Swecker & Mathis, LLP

[57] ABSTRACT

A scalable audio coding/decoding method and apparatus are provided. The coding method includes the steps of (a) signal-processing input audio signals and quantizing the same for each predetermined coding band; (b) coding the quantized data corresponding to the base layer within a predetermined layer size; (c) coding the quantized data corresponding to the next enhancement layer of the coded base layer and the remaining quantized data uncoded and belonging to the enhancement layer, within a predetermined layer size; and (d) sequentially performing the layer coding steps for all layers, wherein the steps (b), (c) and (d) each comprise the steps of: (i) obtaining gamut bit allocation information representing the number of bits of the quantized data corresponding to the respective subbands belonging to a layer to be coded; (ii) obtaining the number of bits allocated to the respective subbands within each subband size of the layers; (iii) generating an index representing the presence of quantized data for predetermined frequency components forming the subbands for the quantized data corresponding to the number of allocated bits; and (iv) generating bitstreams by coding the quantized data corresponding to the gamut bit allocation information, quantization step size, index and number of bits allocated to the respective subbands, by a predetermined coding method.

30 Claims, 12 Drawing Sheets

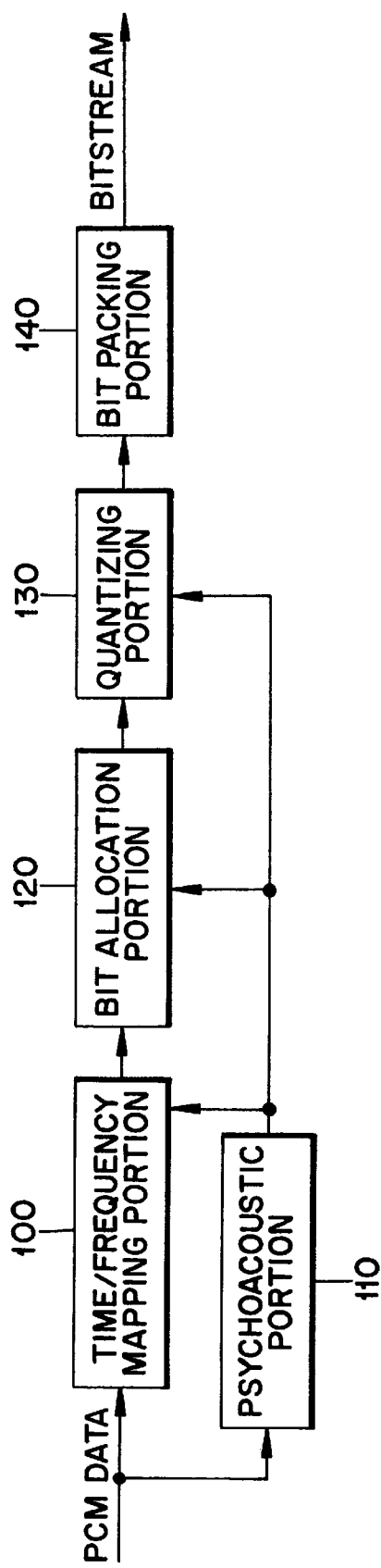
FIG. 1
CONVENTIONAL
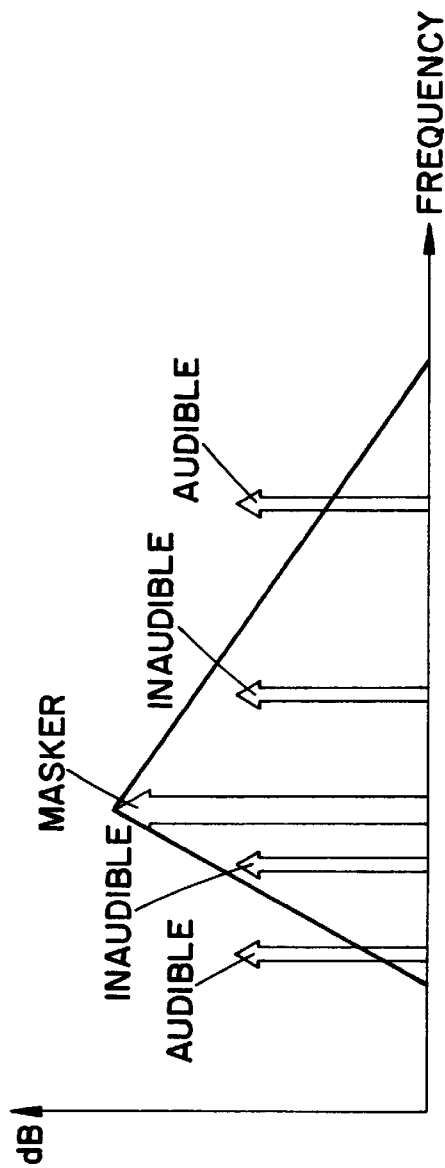
FIG. 2
CONVENTIONAL

FIG. 3
CONVENTIONAL
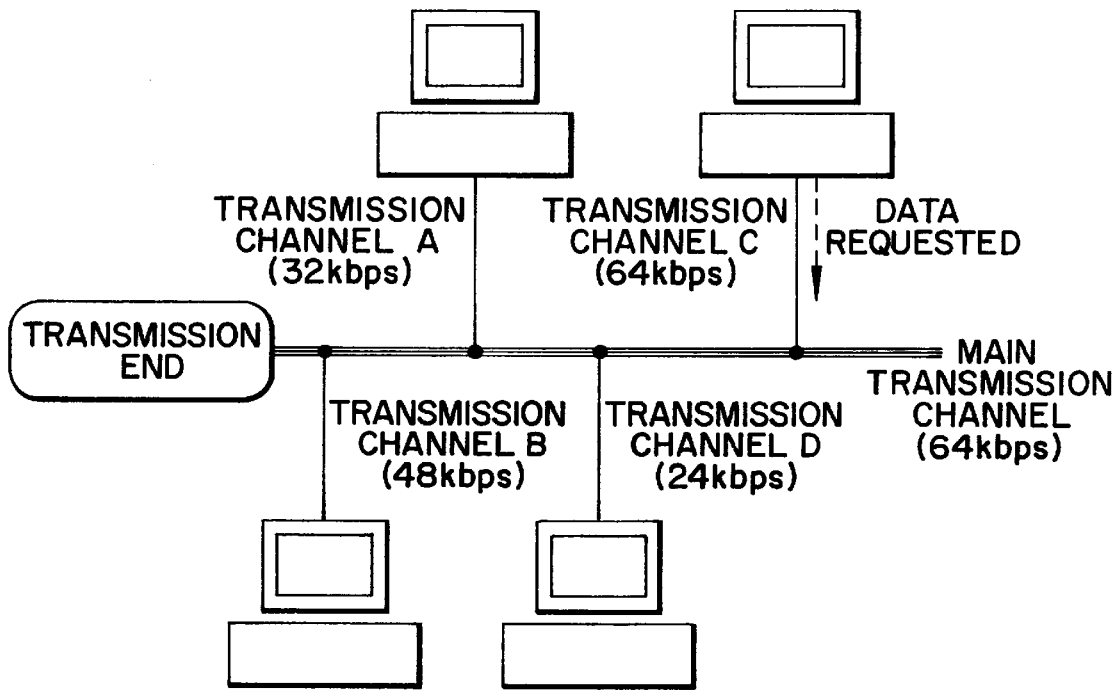
FIG. 4
CONVENTIONAL

FIG. 5
CONVENTIONAL
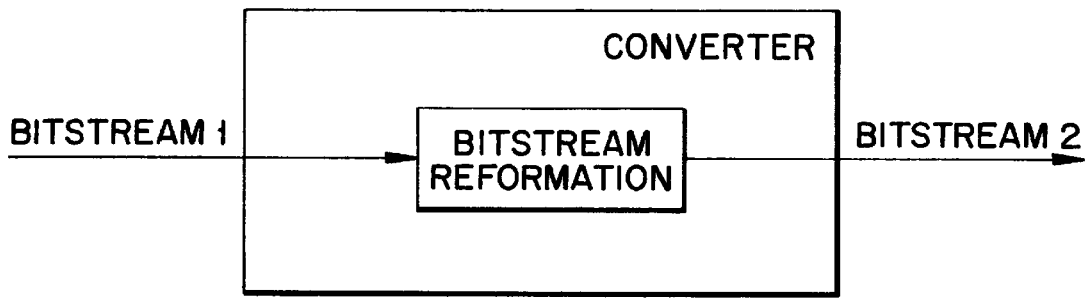
FIG. 6
CONVENTIONAL
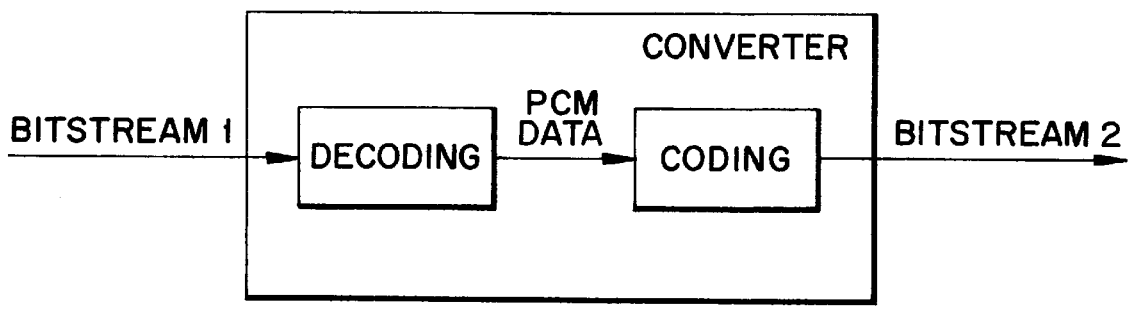

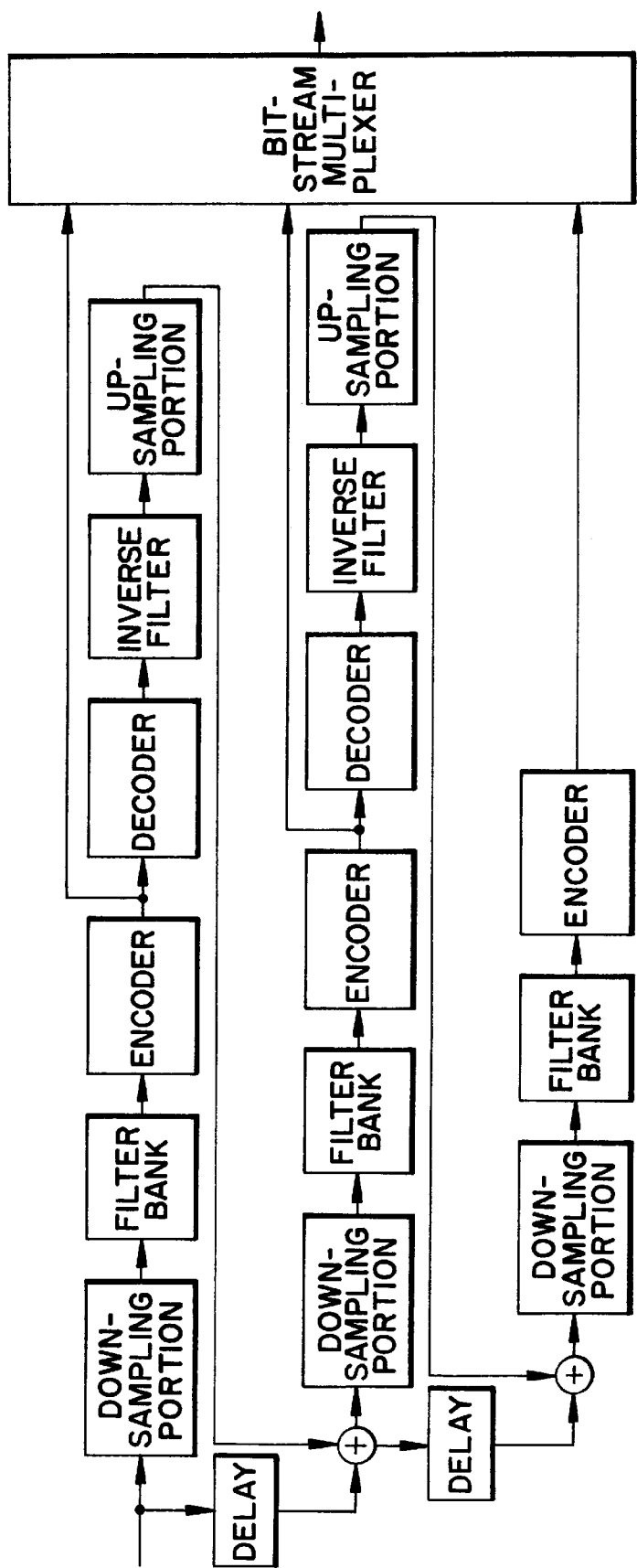
FIG. 7
CONVENTIONAL

QUANTIZED VALUE WHEN NMR=0

FIG. 9B

CODED VALUE

```
1 1
0 0
0 0
0 0
```
↑ ↑
| DATA
INDEX

DECODED VALUE

CODED VALUE

```
1 1
0 0
0 0
1 1
```
↑ ↑
| DATA
INDEX

DECODED VALUE

CODED VALUE (d)
```
0 0
0 0
0 0
0 0
```
↑ ↑
| DATA
INDEX

DECODED VALUE

```
1 : 1100001
2 : 0000000
3 : 0000000
4 : 0100001
```

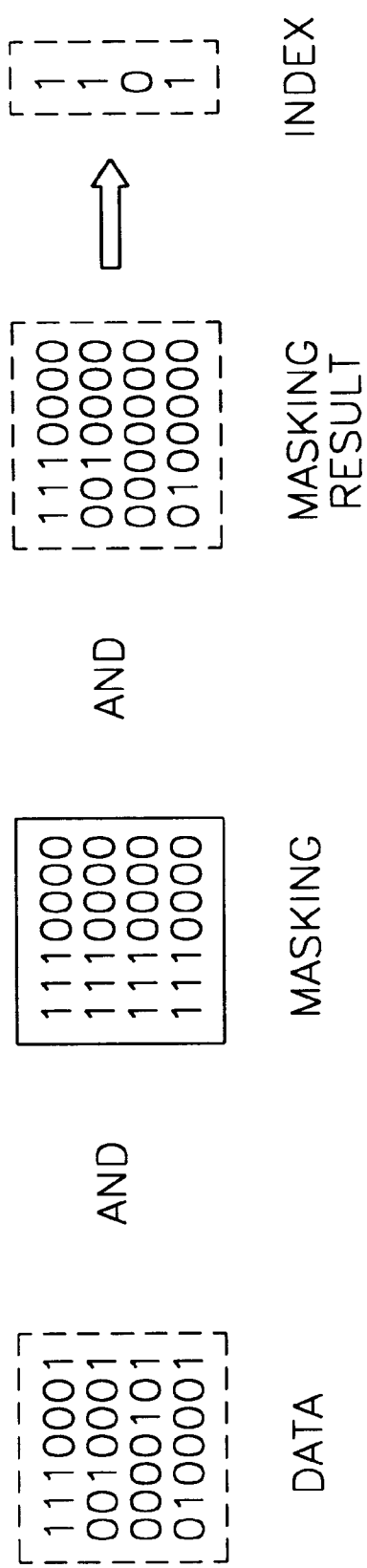

SCALABLE AUDIO CODING/DECODING METHOD AND APPARATUS

BACKGROUND OF THE INVENTION

1. Field of the Invention

The present invention relates to audio coding and decoding, and more particularly, to a scalable audio coding/decoding method and apparatus, which represents data for bitrates of various enhancement layers based on a base layer, instead of forming a bitrate within one bitstream. Further, this invention is closely related to ISO/IEC JTC1/SC29/WG11 N1903 (ISO/IEC 14496-3 Subpart 4 Committee Draft).

2. Description of the Related Art

An audio system stores a signal in a recording/storage medium and then reproduces the stored signal upon a user's request.

By the recent development of digital signal processing technology, the recording/storage media have progressed from a conventional analog type such as an LP or magnetic tape to a digital type such as a compact disc or digital audio tape. The digital storage/restoration method solves deterioration in audio quality and considerably improves the audio quality, in contrast to the conventional analog method. However, there is still a problem in storing and transmitting a large amount of digital data.

To reduce the amount of digital data, DPCM (Differential Pulse Code Modulation) or ADPCM (Adaptive Differential Pulse Code Modulation) for compressing digital audio signals has been developed. However, such methods have a disadvantage in that a big difference in efficiency is generated according to signal types. An MPEG (Moving Picture Expert Group) audio technique recently standardized by the ISO (International Standard Organization), DCC (Digital Compact Cassette) manufactured by Phillips Corp, MD (Mini Disc) manufactured by Sony Corp. and the like use a human psychoacoustic model to reduce the quantity of data. Such conventional methods have considerably reduced the quantity of data effectively, irrespective of signal characteristics.

An audio coding apparatus which takes the human psychoacoustics into consideration includes a time/frequency mapping portion 100, a psychoacoustic portion 110, a bit allocating portion 120, a quantizing portion 130 for performing quantization according to allocated bits, and a bit packing portion 140, as shown in FIG. 1. Here, the psychoacoustic portion 110 calculates a signal-to-masking ratio (SMR) using human auditory characteristics, particularly a masking phenomenon; a masked threshold, i.e., the minimum magnitude of the signal, which is imperceptible by the interaction with the respective signals. The bit allocating portion 120 allocates bits within the range of limited bits from the part including signals important for audibility using the masked threshold, thereby realizing effective data compression.

In coding a digital audio signal, important human auditory characteristics are a masking effect and a critical band feature. The masking effect is a phenomenon in which a signal (sound) inaudible by another signal (sound). FIG. 2 illustrates the masking phenomenon. For example, when conversation is made in a low voice at a railway station and a train passes through the station, the conversation is not audible due to the noise generated by the train. The magnitude of the perceptible noise may differ between the cases when the noise magnitude is in the range of a critical band and out of the range thereof. Here, the noise is more perceptible in the case when the noise magnitude exceeds the range of the critical band, than the other case.

To perform coding using human auditory characteristics, the magnitude of noises capable of being allocated to a critical band is calculated by these two features, i.e., the masking effect and critical band. Example applications of the digital audio coding method include digital audio broadcasting (DAB), Internet phone, and audio on demand (AOD).

Most of such coding methods support a fixed bitrate. In other words, a bitstream is constructed with a specific bitrate (128 Kbps, 96 Kbps or 64 Kbps, for example). This construction involves no problem when a transmission channel is dedicated to audio data. Since a dedicated channel fixedly supports a specific bitrate, a bitstream constructed with a specific bitrate for the dedicated channel is transmitted to a reception end without error.

However, if a transmission channel for audio data is unstable, it is difficult to properly interpret the data with a fixed bitrate at the reception end. In other words, depending on the state of the transmission channel, the bitstreams of the entire audio data or only some of the bitstreams may be received at the reception end. If only some of the bitstreams are received at the reception end, it is difficult to restore the audio data corresponding thereto, which considerably deteriorates audio quality.

Generally, in the digital audio coding method, a bitstream contains only the information for one bitrate in its header, and the bitrate is maintained. For example, if header information of one bitstream represents a bitrate of 128 Kbps, the 128 Kbps bitstream is continuously used, which is advantageous in representing the best audio quality at the corresponding bitrate. In other words, the optimal bitstream for audio data, such as 64 Kbps, 48 Kbps or 32 Kbps, is formed for a specific bitrate.

However, such a method is very sensitive to the state of the transmission channel. Thus, if the transmission channel is very unstable, correct data cannot be reproduced. For example, when an audio frame is constructed by n slots, if the n slots are all transmitted to the reception end within a given time, correct data can be reconstructed. However, if n−m slots are transmitted due to an unstable transmission channel, correct data cannot be reconstructed.

Also, referring to FIG. 3, the case when data supplied from a transmission end is received at several reception ends will be described. If the capacities of the respective transmission ends of the reception ends are different from one another, or the respective reception ends require different bitrates, the transmission end supporting only a fixed bitrate cannot satisfy the requirement. In this case, if the audio bitstream has separate bitrates for various layers, it is possible to confront a given environment or a user's request appropriately.

To this end, there are three methods for scaling bitrates. First, since information for various layers is sequentially arranged in a bitstream, the bitstream is simply sliced with a desired bitrate to then be transmitted. As shown in FIG. 4, the bitstreams are sequentially constructed from the base layer to the top layer. Then, side information for each layer and audio data are recorded in one bitstream. Therefore, if a user requests only the base layer, the bitstream corresponding to the base layer is transmitted. If the information for the first layer (Layer 1) is requested, only the bitstreams up to the first layer are transmitted. Also, if the information for the top layer is requested, all bitstreams are transmitted.

Second, a device (a converter, for example) reformats the bitstreams between a transmission end and a reception end at a user's request. That is to say, a coding apparatus shown in FIG. 5 forms a bitstream with one bitrate, and then the converter reformats and transmits the bitstream at a lower bitrate at the user's request. At this time, the bitstream formed by the coding apparatus must contain side information so that the converter can form a bitstream of a lower layer.

Third, as shown in FIG. 6, the converter performs reencoding. The reencoding is to form and transmit the bitstream at a bitrate requested by the user through all decoding steps for forming PCM data and all coding steps. For example, when a bitstream of 64 Kbps is transmitted to a main transmission channel and the capacity of a transmission channel for a user is 32 Kbps, the converter installed therebetween forms PCM data using a decoder for 64 Kbps and then operates an encoder for 32 Kbps to form 32 Kbps bitstream to then transmit the data through the transmission channel.

Among the above-described methods, the first method is the most suitable, but this method has a disadvantage of a lowered performance due to the data redundancy in the respective layers. The second method can slightly improve a little the audio quality, compared to the first method. However, formatting the bitstream with a lower bitrate may vary depending on side information transmitted from the encoder. Also, since the procedure passes through the converter, this method is more disadvantageous than the first method in view of delays and cost. In the third method, since the converter serves as a decoder and an encoder, the complexity increases, which makes the procedure costly and causes delays due to reformatting. However, since there is no redundancy in the bitstreams input to the converter, the audio quality in the third method is better than that in the first method. Although it is quite difficult to discriminate between the second method (reformatting) and the third method (reencoding), the third method adopts dequantization in forming a lower bitstream.

In a scalable system, since the converter serves to simply connect the user with the transmission end, the complexity of the converter must be reduced. Therefore, since a less complex converter having no delays and costing less is generally used, a method in which reencoding is not used has been adopted. Generally, to form the bitstream as in the first method, as shown in FIG. 7, coding is first performed for lower layers, decoding is then performed, and a difference between the original signal and the decoded signal is input to an encoder for the next layer to then be processed. This method generally adopts at least two coding methods. That is to say, a core codec for generating a base layer is used together with another codec for generating other layers. However, such a method increases the complexity of a coding system due to the presence of at least two encoders. The complexity of a decoding system also increases with a plurality of decoders. Also, the more the layers, the more complex coding becomes. This is because correct temporal domain data of the corresponding layer can be obtained by summing the respective temporal domain data generated for the respective layers.

SUMMARY OF THE INVENTION

To solve the above problems, it is an object of the present invention to provide a scalable audio coding/decoding method and apparatus which can allow a transmission channel to be efficiently used, satisfy various users request, and can provide a good audio quality bitstream by combining information for bitrates of various layers in a bitstream without being overlapped.

To accomplish the object, the present invention provides a scalable audio coding method for coding audio signals into a layered datastream having a base layer and a predetermined number of enhancement layers. The method includes the steps of (a) signal-processing and quantizing input audio signals for each predetermined coding band and (b) coding the quantized data corresponding to the base layer within a predetermined layer size. The method further includes (c) coding the quantized data corresponding to the next enhancement layer of the coded base layer and the remaining quantized data uncoded and belonging to the coded layer, within a predetermined layer size; and (d) sequentially performing the layer coding steps for all layers. The steps (b), (c) and (d) each include the steps of (i) obtaining gamut bit allocation information representing the number of bits of the quantized data corresponding to the respective subbands belonging to a layer to be coded and (ii) obtaining the number of bits allocated to the respective subbands within each subband size of the layers. Additionally, steps (b), (c) and (d) each include the steps of (iii) generating an index representing the presence of quantized data for predetermined frequency components forming the subbands for the quantized data corresponding to the number of allocated bits and (iv) generating bitstreams by coding the quantized data corresponding to the gamut bit allocation information, quantization step size, index and number of bits allocated to the respective subbands, by a predetermined coding method.

The quantized data corresponding to the number of allocated bits is quantized from the most significant bit to the least significant bit.

Coding of the quantized data corresponding to the number of allocated bits is performed in the step (iv) by coupling the quantized data in units of bits of a predetermined number.

The number of allocated bits in the step (ii) is one bits, and the step (iv) is to generate the gamut bit allocation information and index as bitstreams by a predetermined coding method. Here, the predetermined coding method is lossless coding. The lossless coding is Huffman coding or Arithmetic coding.

The step (a) includes converting the input audio signals of a temporal domain into signals of a frequency domain, coupling the converted signals as signals of predetermined subbands by time/frequency mapping and calculating a masking threshold at each subband. Step (a) further includes quantizing the signals for each predetermined coding band so that quantization noise of each band is smaller than the masking threshold.

Also, there is provided a scalable audio coding apparatus for coding audio signals to have layered bitrate data having bitrates of a predetermined number. The apparatus includes a quantizing portion for signal-processing input audio signals and quantizing the same for each coding band, and a bit packing portion for generating bitstreams by coding gamut bit allocation information for each subband of a base layer, representing the number of bits of quantized data of the respective subbands belonging to the base layer, index representing the presence of data for predetermined frequency components of the quantized data corresponding to the number of bits allocated to the respective subbands, quantization step size and the quantized data, and coding gamut bit allocation information, index, quantization step size and quantized data of the next layer after completing coding of the base layer, to perform coding on all layers.

Coding the quantized data corresponding to the number of the allocated bits for each subband is performed sequentially from the most significant bits to lower significant bits.

When the bit packing portion collects and codes the bits according to significance, coding is performed by coupling the bits in a predetermined number unit.

The number of allocated bits of the bit packing portion is one bits, and the coding is performed on the gamut bit allocation information and index by a predetermined coding method.

The bit packing portion performs coding sequentially from low frequency components to high frequency components.

The quantizing portion includes a time/frequency mapping portion for converting the input audio signals of a temporal domain into signals of a frequency domain and a psychoacoustic portion for coupling the converted signals by signals of predetermined subbands by time/frequency mapping and calculating a masking threshold at each subband. The quantizing portion further includes a portion for quantizing the signals for each predetermined coding band so that quantization noise of each band is smaller than the masking threshold.

According to another aspect of the present invention, there is provided a scalable audio decoding apparatus for decoding audio data coded to have layered bitrates. The apparatus includes a bitstream analyzing portion for decoding gamut bit allocation information for each subband of a base layer, representing the number of bits of quantized data of the respective subbands belonging to the base layer, an index representing the presence of data for predetermined frequency components of the quantized data corresponding to the number of bits allocated to the respective subbands, quantization step size and the quantized data, in the generated order of the layers of the bitstreams. The decoding is performed by obtaining the number of bits allocated to the subbands belonging to each layer and decoding the quantized data corresponding to the number of allocated bits referring to the index. The apparatus also includes an inverse quantizing portion for restoring the decoded quantization step size and quantized data into signals having the original magnitudes, and a frequency/time mapping portion for converting inversely quantized signals into signals of a temporal domain.

Decoding the quantized data in the decoding step is performed from the most significant bit to lower significant bits.

BRIEF DESCRIPTION OF THE DRAWINGS

The above objects and advantages of the present invention will become more apparent by describing in detail a preferred embodiment thereof with reference to the attached drawings in which:

FIG. 1 is a block diagram of a general audio data coding apparatus using psychoacoustic characteristics;

FIG. 2 is a diagram describing a masking phenomenon;

FIG. 3 is a block diagram showing a general transmission channel system;

FIG. 4 shows a bitstream containing information for bitrates of multiple layers;

FIG. 5 is a diagram describing reformatting;

FIG. 6 is a diagram describing reencoding;

FIG. 7 is a block diagram of a general scalable coding apparatus;

FIGS. 9A through 9G illustrate the operational principle of a coding apparatus according to the present invention;

FIG. 10 illustrates index extraction using a bit plane mask;

DESCRIPTION OF THE PREFERRED EMBODIMENT(S)

Hereinbelow, preferred embodiments of the present invention will be described in detail with reference to accompanying drawings. In the present invention, the bitstream for the bitrates of the respective layers is simply reformatted to then be transmitted according to a users' request or according to state of a transmission channel, by representing the information for the bitrates of multiple layers in a bitstream. For example, when the base layer is 16 Kbps, the top layer is 64 Kbps and each enhancement layer is 8 Kbps, the information for the respective layers of 16 Kbps, 24 Kbps, 32 Kbps, 40 Kbps, 48 Kbps, 56 Kbps and 64 Kbps is contained in the bitstream for the top layer of 64 Kbps. If a user requests data for the top layer, this bitstream is transmitted without any processing. Also, if a user requests data for the base layer corresponding to 16 Kbps, only the bitstream of the front part is cut and transmitted.

Figure 8:
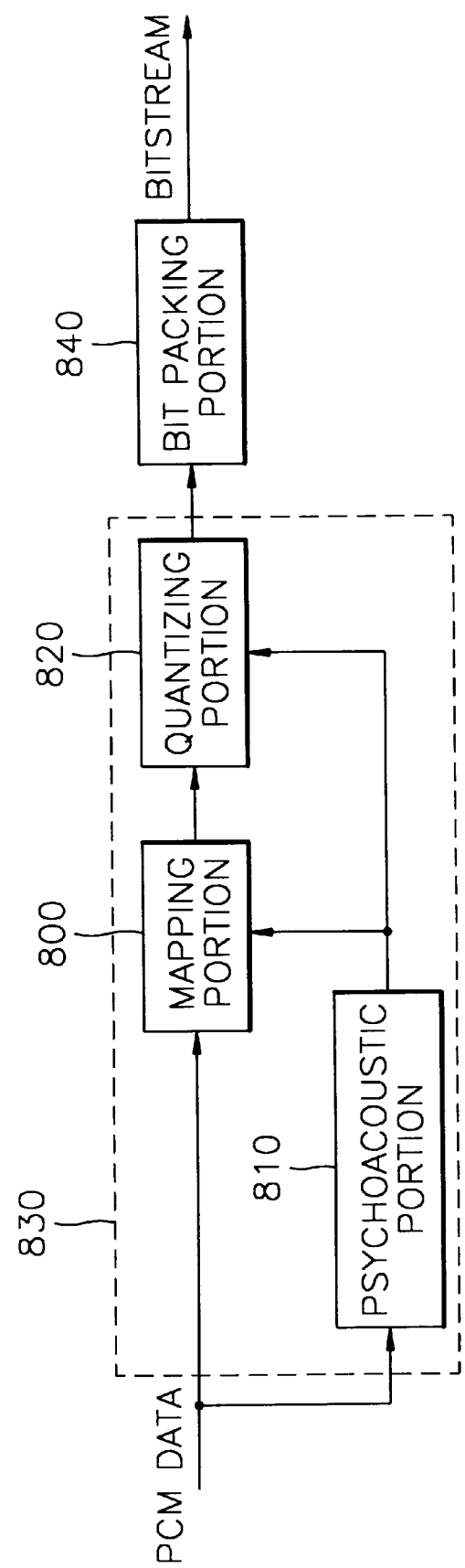
FIG. 8 is a block diagram of a coding apparatus according to the present invention.
Figure 9E:
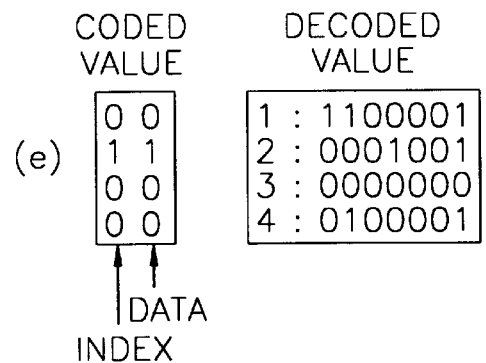
Figure 9F:
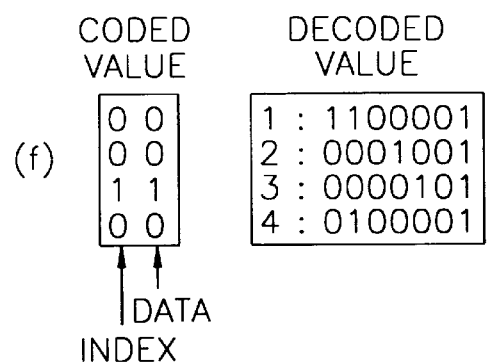
Figure 9G:
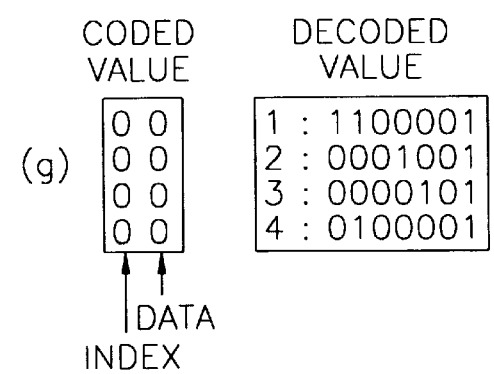

FIG. 8 is a block diagram of a coding apparatus according to the present invention, which includes a quantization processing portion 830 and a bit packing portion 840.

The quantization processing portion 830 for signal-processing input audio signals and quantizing the same for predetermined coding bands, includes a time/frequency mapping portion 800, a psychoacoustic portion 810 and a quantizing portion 820.

The time/frequency mapping portion 800 converts the input audio signals of a temporal domain into signals of a frequency domain. A perceived difference between signal characteristics by the human ear is not very large temporally. However, according to the human psychoacoustic models, a big difference is produced for each band. Thus, compression efficiency can be enhanced by allotting different quantization bits depending on frequency bands.

The psychoacoustic portion 810 couples the converted signals by signals of predetermined subbands by the time/frequency mapping portion 800 and calculates a masking threshold at each subband using a masking phenomenon generated by interaction with the respective signals.

The quantizing portion 820 quantizes the signals for each predetermined coding band so that the quantization noise of each band becomes smaller than the masking threshold. In other words, the frequency signals of each band are applied to scala quantization so that the magnitude of the quantization noise of each band is smaller than the masking threshold, so as to be imperceptible. Quantization is performed so that the NMR (Noise-to-Mask Ratio) value, which is a ratio of the masking threshold calculated by the psychoacoustic portion 810 to the noise generated at each band, is less than or equal to 0 dB. The NMR value less than or equal to 0 dB means that the masking threshold is higher than the quantization noise. In other words, the quantization noise is not audible.

The bit packing portion 840 codes side information corresponding to a base layer having the lowest bitrate and the quantized data, successively codes side information corresponding to the next layer of the base layer and the quantized data, and performs this procedure for all layers, to generate bitstreams, which will be described in more detail below. Gamut bit allocation information representing the number of bits of the quantized data corresponding to the respective layers is obtained for the respective subbands belong to a pertinent layer to be coded. Then, the number of bits allocated for the respective bands is obtained within the band size range for the respective layers. For the quantized data corresponding to the number of bits allocated to each band, the indices representing the presence of the quantized data for predetermined frequency components consisting of the respective bands are generated. The quantized data corresponding to the number of bits allocated to the respective bands is coded from the MSB of the quantized data to lower bits. Coding of the quantized data may be performed from lower frequency components to higher frequency components in the unit of a predetermined number of bits.

Now, the operation of the present invention will be described. As shown in FIG. 7, the most widely used method for recording information of multiple layers in a bitstream is to store the result of the coding performed from high layers to lower layers, to decode the result, and to process and store the difference between the reconstructed signal and the original signal in the next layer. When the base layer is 16 Kbps, for example, the 16 Kbps coding result is stored in the bitstream. Assuming a difference between the original signal and the decoding result of the 16 Kbps coded data, coding is performed on the next layer. In such a method, since there are many redundant portions in the bitstream, the audio quality is degraded. In other words, the data of lower frequency bands is redundant in several layers. To avoid redundancy, there must be continuity between data represented in the respective layers for the same frequency component. For example, if m bits are allocated to i–th layer and n bits are allocated to the (i–l)-th layer, the data represented by (n+m) bits must be effective as a piece of information.

In the present invention, to maintain continuity between data represented in the respective layers for the same frequency component, the data is represented from the MSB, which will be described with reference to FIGS. 9A–9G.

FIG. 9A shows the quantization result for NMR 0, performed by the quantizing portion 820. The data is represented from the MSB in each layer. In other words, only the MSB is represented in the base layer, as shown in FIG. 9B. If representation is performed up to the top layer in such a manner, all bits of data are represented. Therefore, as the layer advances, more detailed information is represented. The data transmitted to the decoder includes gamut bit allocation information representing the size of the bits allocated to the band, data index, and data bits. The index represents where the data bits are positioned in the band. This is generated by using a bit plane mask. All bits of the bit plane mask have a value of 1. The index is generated by performing an AND operation on the bit plane mask and the MSB of the data by the number of bits of the mask, as shown in FIG. 10.

For the band of the example shown in FIG. 10, the bit allocation information is 7 bits. For example, the uppermost data is recognized as '1000000' by the decoder even if there is only one 1-bit data in the MSB of the base layer. By the fact that the MSB is 1, the value of this band whose maximum bit number is 7 is greater than '1000000.' This value is recognized as '1100000' by one bit of the next layer. The index represents a data value of 1 as well as a data position. Thus, 1 as the index value is excluded from the '1000001' representation in FIGS. 9A–9G. Therefore, '1000001' is reconstructed in the decoder by adding 1 as the index value with '1000000' represented by data bits. In FIGS. 9A–9G, the data subsequent to the second and fifth steps represents all data without being transmitted to the decoder. Data is represented using Huffman coding, run-length coding or Arithmetic coding. Data is used as the bit corresponding thereto. Also, when the data bit is a 1-bit data bit, the data bit can be also represented by the index. This means that the MSB exists in the corresponding position, by the value of 1 generated by masking. Thus, even if there is no further data bit, the entire value can be represented. For example, when the bit allocation information is 5, 1 being the index value of the base layer represents 1 and '10000.' Thus, the restored value is '10001.'

As described above, a 1-bit data bit is represented in each layer, which essentially can be transformed to represent one or more bits in each layer.

To represent data for each band, first, the MSB of the band corresponding to each layer is represented by at least one bit, and then data is sequenced in the magnitude order of the bit allocation information, from lower bands to higher bands. In other words, since the band having a large bit allocation information is an important band, it is coded first. Since the band having a small bit allocation information is a less important band, it is coded later. The following algorithm is used for generating data of each layer, by which the bit allocation information and data of each layer are calculated to form a scalable bitstream.

```
for (band = 0; band < band_end[Top_Layer]; band++)
    for (layer = Base_Layer; layer < Top_Layer; layer++)
        layer_bal[layer][band] = 0;
/*max_bit_alloc: bit size of corresponding band
            calculated by quantizer*/
for (band = 0; band < band_end[Top_Layer]; band++)
    bit_alloc[band] = max_bit_alloc[band];
used_bits = 0;
for (layer = Base_Layer; layer < Top_Layer; layer++)
{
for (band = band_start[layer]; band < band_end[layer];
                band++)
{
    if (bit_alloc[band] < 2) continue;
    layer_bal[layer][band] = bit_alloc[band]/2;
    bits = quantizer (isample,
                layer_sample[layer],
                bit_alloc[band],
                layer_bal[layer][band],
                band);
    if (used_bits+bits > available_bits_for_this_layer[layer])
        break;
    used_bits += bits;
    bit_alloc[band] -= layer_bal[layer][band]
}
while (used_bits < available_bits_for_this_layer[layer])
{
    band = −1;
    max_bal = 0;
    for (scfb = 0; scfb < band_end[layer]; scfb++)
    {
        if (max_bal < bit_alloc[scfb])
        {
            max_1 bal = bit_alloc[scfb];
            Band = scfb;
        }
    }
    layer_bal[layer][band]++;
```

```
        bit_alloc[band]--;
        bits = quantizer (isample,
                    layer_sample[layer]
                    max_bit_alloc[band]
                    band);
        if (used_bits+bits > available_bits_for_this_layer[layer])
        {
            layer_bal[layer][band]--;
            bit_alloc[band]++;
            break;
        }
        used_bits += bits;
    }
}
for (band = 0; band < band_end[layer]; band++)
    Max_bit_alloc[band] -= layer_bal[layer][band];
}
```

Figure 11A:
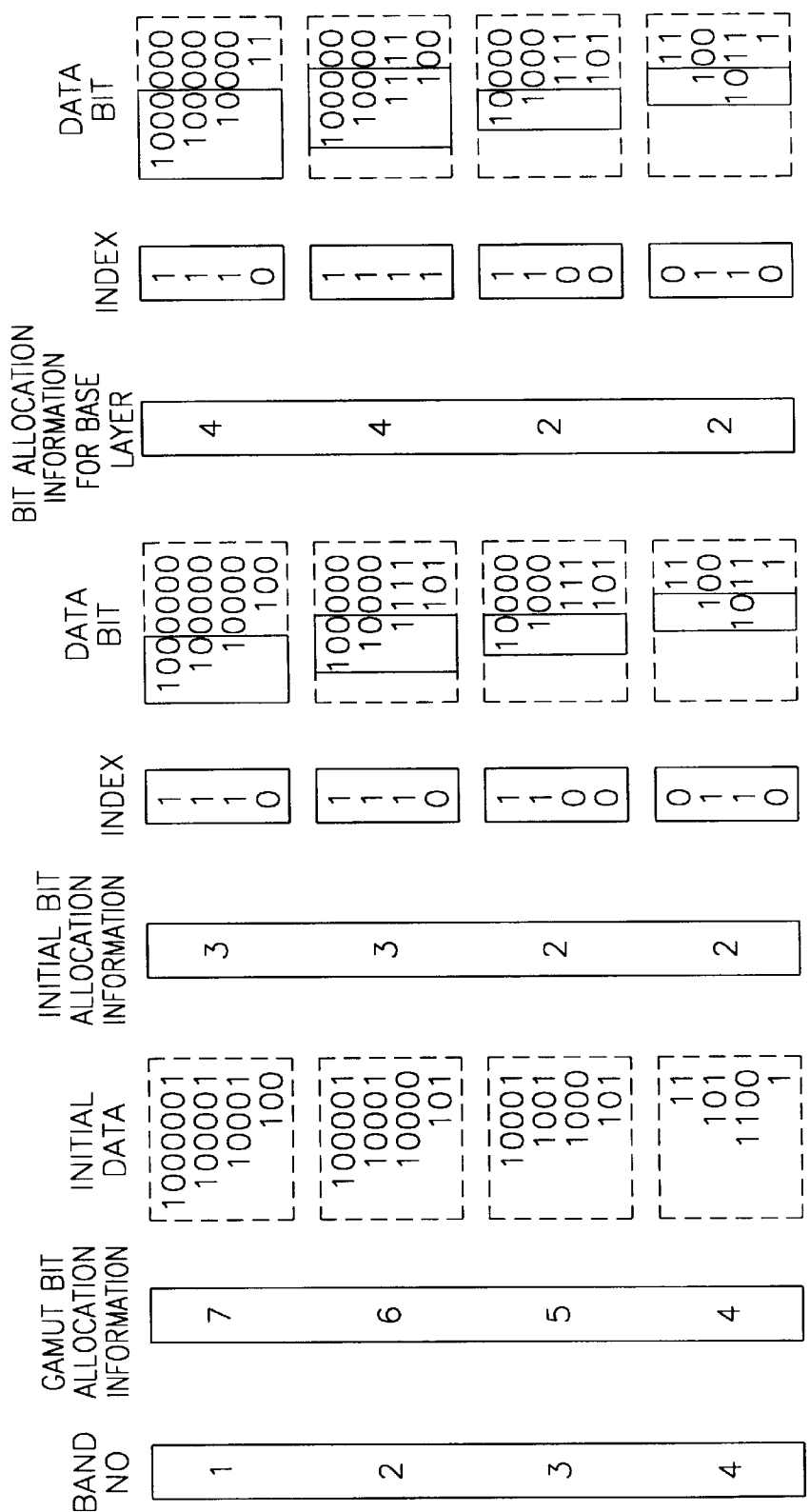
FIGS. 11A and 11B illustrate execution of a data generation algorithm.
Figure 11B:
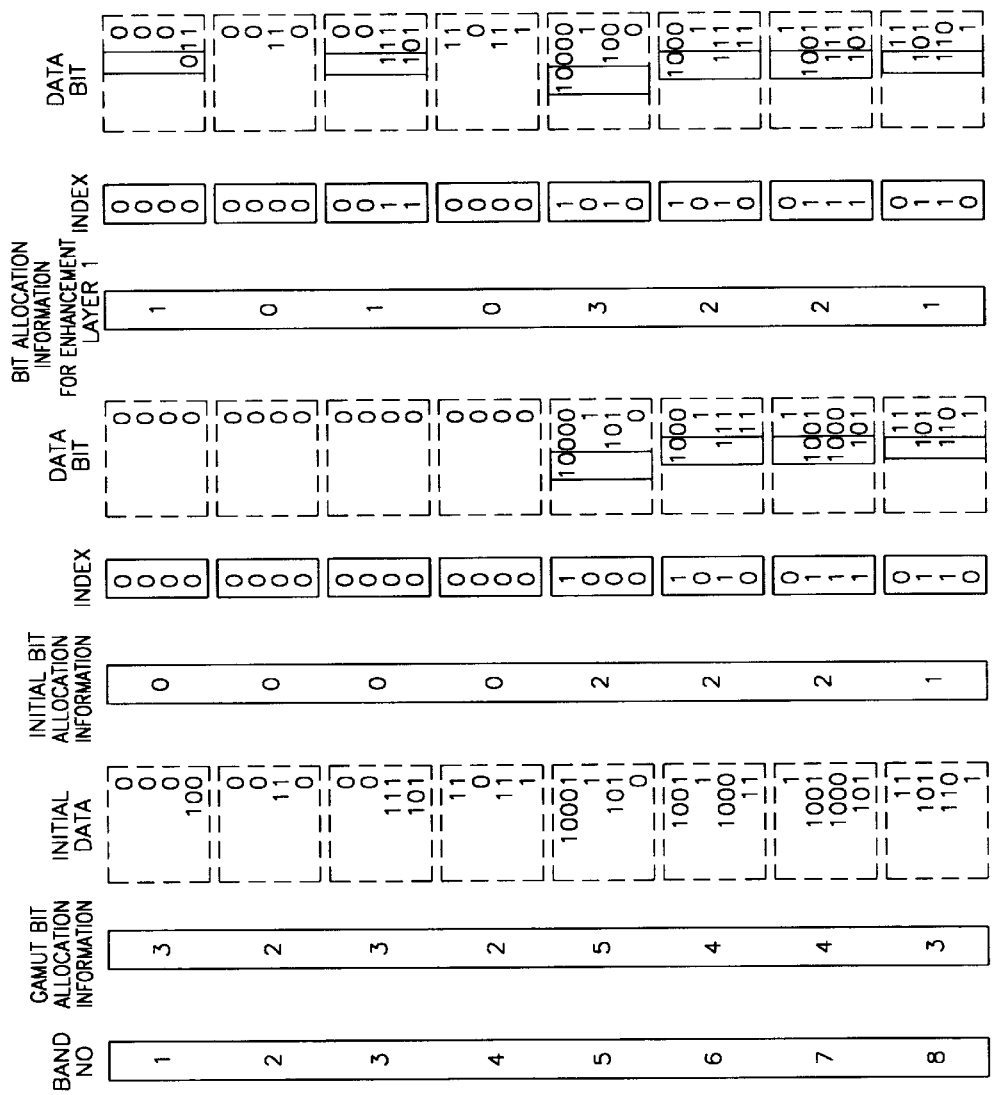

FIGS. 11A and 11B illustrate execution of a data generation algorithm for the base layer and a layer 1, for example. In FIGS. 11A and 11B, initial bit allocation information corresponds to a half the gamut bit allocation information. Then, among the remaining bit allocation information [(gamut bit allocation information)-(initial bit allocation information)], bit allocation is performed in the order of the information magnitude. In the above algorithm, further bits can be given only up to the second band within the allowable bits in the base layer. After processing of the base layer is finished, the signal obtained by subtracting the processed signal from the original signal is processed in the next layer.

As the layer advances in such a manner, a more detailed data value can be represented. Thus, according to the enhancement of layers, audio quality can be improved.

Figure 12:
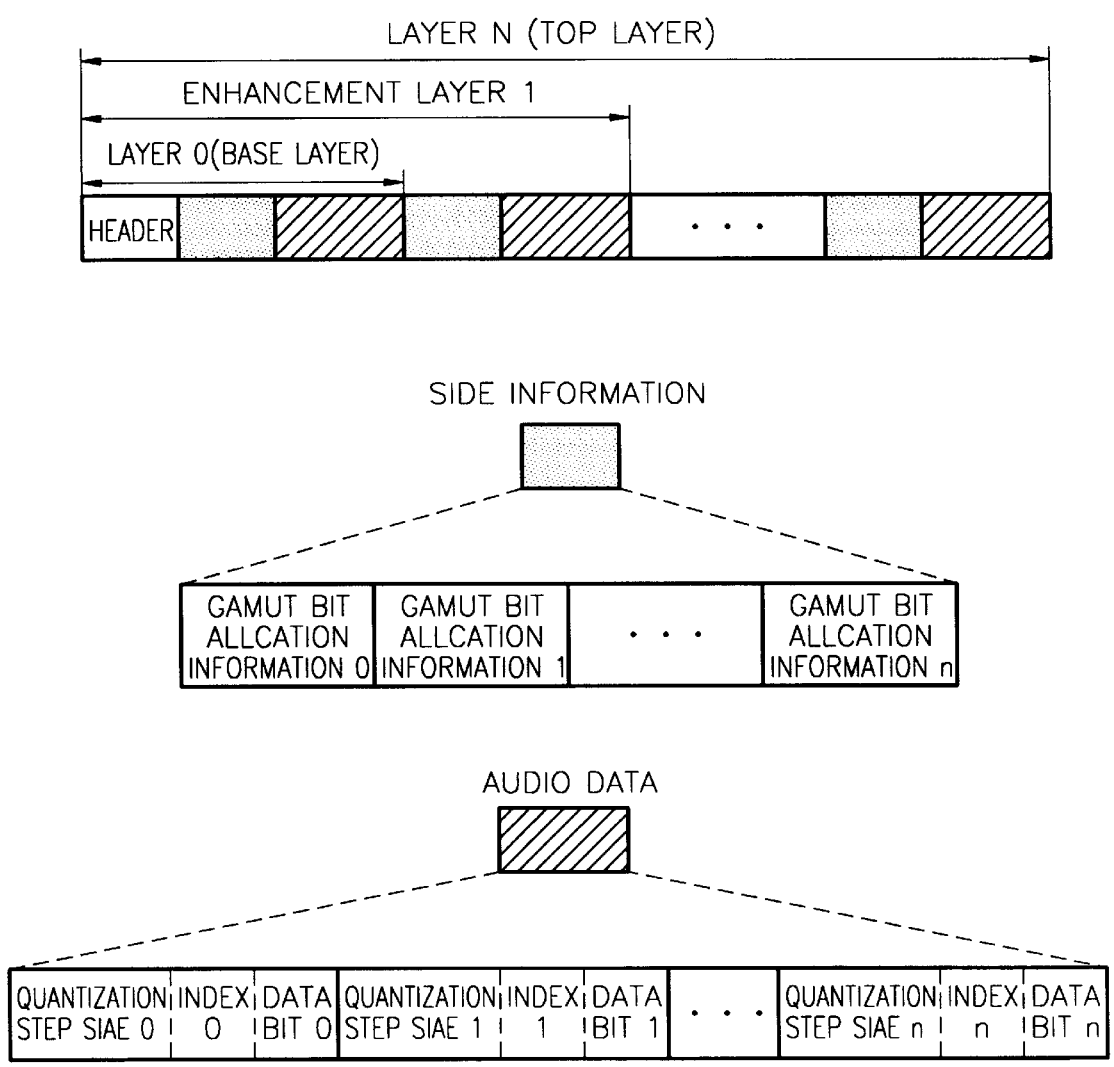
FIG. 12 shows a bitstream structure formed according to the present invention.

The method for forming scalable bitstreams using such represented data will now be described. First, side information for the bandwidth of the base layer is recorded. The side information includes bit allocation information for each band and a quantization step size necessary for dequantization. Here the quantization step size is recorded when bit allocation is performed to the corresponding band for the first time. After the side information, the audio data value for the base layer is recorded. Recording of the data value is sequentially performed after the MSB information from the first band to the band representable within the bit allowance depending on the bitrate of the base layer, and the data index are calculated. In FIGS. 11A and 11B, the index and the data bit indicated by solid-line squares are recorded within the bitstream. At this time, if the bit allocation information is zero for each layer, no data is recorded. Also, when the bit allocation information is not zero for each layer, if there is no information for the index (that is, if indexes are all zero), the data bit is not recorded and only the index is recorded. After recording for the base layer is completed, the side information and quantized value audio data for the next layer are recorded. Data of all layers are recorded in such a manner. FIG. 12 shows the structure of the thus recorded bit stream.

Now, the coding method according to the present invention will be described in detail through an example. For example, the bitrate of a base layer is 16 Kbps, the bitrate of a top layer is 64 Kbps, and the respective enhancement layers have a bitrate interval of 8 Kbps, that is, the bitstream has 7 layers of 16 Kbps, 24 Kbps, 32 Kbps, 40 Kbps, 48 Kbps, 56 Kbps and 64 Kbps. As demonstrated in the following table 1, the processed bandwidth of each layer is limited. Input data is a PCM data sampled at 48 kHz, and the magnitude of one frame is 1024. The number of bits usable for one frame for a bitrate of 64 Kbps is 1365 (=64000 bits/sec*(1024/48000)) on the average.

TABLE 1

| Bit rate (Kbps) | Bandwidth (KHZ) |
|---|---|
| 16 | 3.5 |
| 24 | 6 |
| 32 | 7.5 |
| 40 | 10 |
| 48 | 12 |
| 56 | 14 |
| 64 | 16 |

First, necessary information is calculated from the input data using a psychoacoustic model. ISO/IEC 11172-3 Model 2 is employed for calculating the psychoacoustic model. The outputs of the psychoacoustic portion 810 are the block type of a frame being currently processed (long, start, short, or stop), the SMR values of the respective processing bands, section information of a short block and temporally delayed PCM data for synchronization with the psychoacoustic portion 810 and the time/frequency mapping portion 800.

TABLE 2

| Band | Frequency (Hz) | Band | Frequency (Hz) | Band | Frequency (Hz) |
|---|---|---|---|---|---|
| 0 | 188 | 10 | 3093 | 20 | 9843 |
| 1 | 375 | 11 | 3468 | 21 | 10593 |
| 2 | 562 | 12 | 3843 | 22 | 11343 |
| 3 | 844 | 13 | 4593 | 23 | 12093 |
| 4 | 1125 | 14 | 5343 | 24 | 13031 |
| 5 | 1406 | 15 | 6093 | 25 | 14062 |
| 6 | 1687 | 16 | 6843 | 26 | 15093 |
| 7 | 1968 | 17 | 7593 | 27 | 16125 |
| 8 | 2343 | 18 | 8343 | 28 | |
| 9 | 2718 | 19 | 9093 | 29 | |

The time/frequency mapping portion 800 converts data of a temporal domain into data of a frequency domain using MDCT according to the block type output from the psychoacoustic portion 810. At this time, the block sizes are 2048 and 256 in the case of long/start/stop blocks and in the case of a short block, respectively, and MDCT is performed 8 times.

The data converted into data of a frequency domain is quantized using the SMR value output from the psychoacoustic portion 810. Here, scala quantization is performed, and the basic quantization step size is $2^{1/4}$. Quantization is performed so that NMR is equal to or less than 0 dB. Here, the obtained output is information for the quantized data, the quantization step sizes for the respective processing bands, and the number of bits capable of representing the maximum value of the band (i.e., the gamut bit allocation information).

The data for each layer is generated using the above mentioned algorithm, which will now be described through a preferred embodiment. Since the bandwidth of the base layer is 3.5 KHz, the processing bands range to the 12th band. First, using the gamut bit allocation information of up to the 12th band, the bit allocation information of the base layer is generated. Data being within the bits a half that of the gamut bit allocation information is extracted from the 0th band, and the data is checked to determined whether it is capable of being represented within the bit allowance of the base layer. If capable, the same procedure with that for the 0th band is performed on the data of the next band. While the procedure is continued up to the 12th band, if there comes a band exceeding the bit allowance or all bands of up to the 12th band can be represented within the bit allowance, checking is progressed by allocating one bit to the respective bands sequentially from the band having the larger bit allocation information, among the bands being currently processed. A smaller value of either Huffman coded value or run-length coded value is used as the index value. If the processing of the base layer is completed, the value obtained by subtracting the data value processed in the base layer from the original data value is applied as the input data of the next layer. The same processing as that in the base layer is performed on other layers.

Figure 13:
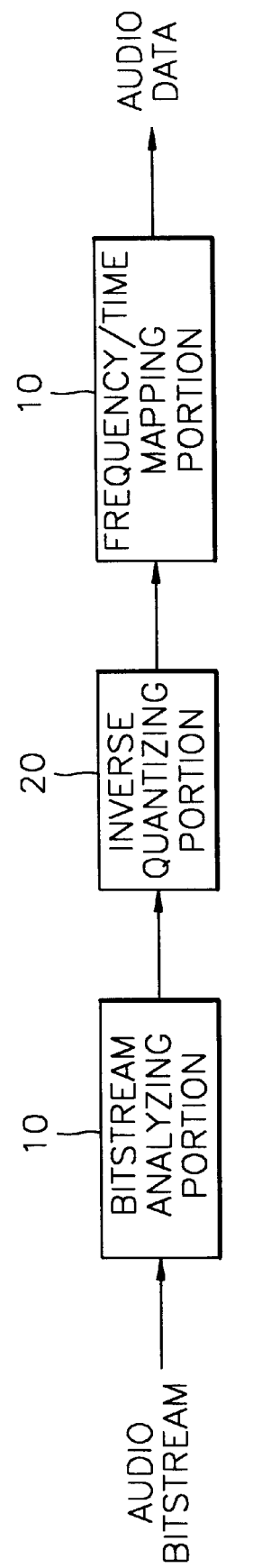
FIG. 13 is a block diagram of a decoding apparatus according to the present invention.

Now, a decoding apparatus for decoding bitstreams generated by the coding apparatus will be described in detail. FIG. 13 is a block diagram of the decoding apparatus, which includes a bitstream analyzing portion 10, an inverse quantizing portion 20 and a frequency/time mapping portion 30.

The bitstream analyzing portion 10 decodes the gamut bit allocation information of the layers, quantization step size, index, and quantized data, in the order of generation of the bitstreams, by obtaining the number of bits allocated to the band belonging to each layer and referring to the index for the quantized data corresponding to the allocated bit number.

The inverse quantizing portion 20 restores the decoded quantization step size and quantized data into signals having the original magnitudes. The frequency/time mapping portion 30 converts inversely quantized signals into signals of a temporal domain so as to be reproduced by a user.

Next, the operation of the decoding apparatus will be described. The order of decoding the bitstreams generated by the coding apparatus is reverse to the coding order. First, the information for the base layer is decoded. The decoding process will be briefly described. First, the side information of the base layer, that is to say, the gamut bit allocation information, quantization step size and index are decoded. Then, the number of bits allocated to the bands belonging to the base layer is obtained and the quantized data corresponding thereto is decoded by referring to the index. Here, the quantized values of the coded bitstreams are decoded sequentially from the MSBs to the LSBs, and from low frequency components to high frequency components. Decoding is performed by the method corresponding to the coding method used in the coding process. Preferably, a lossless decoding method is employed, such as a Huffman decoding method or an Arithmetic decoding method.

After completing decoding of the bitstreams for the base layer, the side information and quantized values of audio data for the next layer are decoded. In such a manner, data of all layers can be decoded. The data quantized through the decoding process is restored as the original signals through the inverse quantizing portion 20 and the frequency/time mapping portion 30, shown in FIG. 13, in the reverse order of the coding.

The invention may be embodied in a general purpose digital computer that is running a program or program segments originating from a computer readable or usable medium, such medium including but not limited to magnetic storage media (e.g., ROM's, floppy disks, hard disks, etc.), optically readable media (e.g., CD-ROMs, DVDs, etc.) and carrier waves (e.g., transmissions over the Internet). A functional program, code and code segments, used to implement the present invention can be derived by a skilled computer programmer from the description of the invention contained herein.

As described above, according to the present invention, data for the bitrates of various layers is represented within one bitstream, thereby adaptively satisfying the state of transmission channels and various users' request.

Also, since the same coder is used for the respective layers, the complexity of the coder is reduced. Further, since data of a frequency domain is processed without coding a difference of data of a temporal domain between the respective layers, the complexity of the coder is reduced.

Similarly, since the same decoder is used for the respective layers, the complexity of the decoder is reduced. Further, since data of a temporal domain is generated just once for each layer, the complexity of the decoder is reduced. Also, since the bitstreams of various layers are simply generated, the complexity of the decoder is reduced. Also, there is continuity among data bits of the respective layers, thereby providing good audio quality and easily confronting the state of transmission channels and users' request.

Also, according to the present invention, to satisfy various users' request, flexible bitstreams are formed. In other words, by the users' request, the information for the bitrates of various layers is combined with one bitstream without redundancy, thereby providing bitstreams having good audio quality. Also, no converter is necessary between a transmission end and a reception end. Further, any transmission channel state and various users' request can be accommodated.

The present invention can be applied to both wired and wireless systems.

What is claimed is:

1. A scalable audio coding method for coding audio signals into a layered datastream having a base layer and a predetermined number of enhancement layers, comprising the steps of:
   (a) signal-processing input audio signals and quantizing the same for each predetermined coding band;
   (b) coding the quantized data corresponding to the base layer within a predetermined layer size;
   (c) coding the quantized data corresponding to the next enhancement layer of the coded base layer and the remaining quantized data uncoded and belonging to the coded layer, within a predetermined layer size; and
   (d) sequentially performing the layer coding steps for all layers, wherein the steps (b), (c) and (d) each comprise the steps of:
      (i) obtaining gamut bit allocation information representing the number of bits of the quantized data corresponding to the respective subbands belonging to a layer to be coded;
      (ii) obtaining the number of bits allocated to the respective subbands within each subband size of the layers;
      (iii) generating an index representing the presence of quantized data for predetermined frequency components forming the subbands for the quantized data corresponding to the number of allocated bits; and
      (iv) generating bitstreams by coding the quantized data corresponding to the gamut bit allocation information, quantization step size, index and number of bits allocated to the respective subbands, by a predetermined coding method.

2. The scalable audio coding method according to claim 1, wherein the quantized data corresponding to the number of allocated bits is quantized from the most significant bit to the least significant bit.

3. The scalable audio coding method according to claim 2, wherein coding of the quantized data corresponding to the number of allocated bits is performed in the step (iv) by coupling the quantized data in units of bits of a predetermined number.

4. The scalable audio coding method according to claim 2, wherein the number of allocated bits in the step (ii) is one bits, and the step (iv) is to generate the gamut bit allocation information and index as bitstreams by a predetermined coding method.

5. The scalable audio coding method according to claim 1, wherein the predetermined coding method is lossless coding.

6. The scalable audio coding method according to claim 5, wherein the lossless coding is Huffman coding.

7. The scalable audio coding method according to claim 5, wherein the lossless coding is Arithmetic coding.

8. The scalable audio coding method according to claim 1, wherein the step (a) comprises the steps of:

converting the input audio signals of a temporal domain into signals of a frequency domain;

coupling the converted signals as signals of predetermined subbands by time/frequency mapping and calculating a masking threshold at each subband; and quantizing the signals for each predetermined coding band so that quantization noise of each band is smaller than the masking threshold.

9. A scalable audio coding apparatus for coding audio signals to have layered bitrate data having bitrates of a predetermined number, comprising:

a quantizing portion for signal-processing input audio signals and quantizing the same for each coding band; and a bit packing portion for generating bitstreams by coding gamut bit allocation information for each subband of a base layer, representing the number of bits of quantized data of the respective subbands belonging to the base layer, index representing the presence of data for predetermined frequency components of the quantized data corresponding to the number of bits allocated to the respective subbands, quantization step size and the quantized data, and coding gamut bit allocation information, index, quantization step size and quantized data of the next layer after completing coding of the base layer, to perform coding on all layers.

10. The scalable audio coding apparatus according to claim 9, wherein coding the quantized data corresponding to the number of the allocated bits for each subband is performed sequentially from the most significant bits to lower significant bits.

11. The scalable audio coding apparatus according to claim 10, wherein, when the bit packing portion collects and codes the bits according to significance, coding is performed by coupling the bits in a predetermined number unit.

12. The scalable audio coding apparatus according to claim 10, wherein the number of allocated bits of the bit packing portion is one bits, and the coding is performed on the gamut bit allocation information and index by a predetermined coding method.

13. The scalable audio coding apparatus according to claim 10, wherein the bit packing portion performs coding sequentially from low frequency components to high frequency components.

14. The scalable audio coding apparatus according to claim 9 or 10, wherein the quantizing portion comprises:

a time/frequency mapping portion for converting the input audio signals of a temporal domain into signals of a frequency domain;

a psychoacoustic portion for coupling the converted signals by signals of predetermined subbands by time/frequency mapping and calculating a masking threshold at each subband; and a quantizing portion for quantizing the signals for each predetermined coding band so that quantization noise of each band is smaller than the masking threshold.

15. A scalable audio decoding method for decoding audio data coded to have layered bitrates, comprising the steps of:

decoding gamut bit allocation information for each subband of a base layer, representing the number of bits of quantized data of the respective subbands belonging to the base layer, index representing the presence of data for predetermined frequency components of the quantized data corresponding to the number of bits allocated to the respective subbands, quantization step size and the quantized data, in the generated order of the layers of the bitstreams, decoding being performed by obtaining the number of bits allocated to the subbands belonging to each layer and decoding the quantized data corresponding to the number of allocated bits referring to the index;

restoring the decoded quantization step size and quantized data into signals having the original magnitudes; and converting dequantized signals of a frequency domain into signals of a temporal domain.

16. The scalable audio decoding method according to claim 15, wherein decoding the quantized data in the decoding step is performed from the most significant bit to lower significant bits.

17. The scalable audio decoding method according to claim 15, wherein decoding the quantized data in the decoding step is performed in units of vectors of bits of a predetermined number.

18. The scalable audio decoding method according to claim 15, wherein the decoding step is performed by Arithmetic decoding.

19. The scalable audio decoding method according to claim 15, wherein the decoding step is performed by Huffman decoding.

20. A scalable audio decoding apparatus for decoding audio data coded to have layered bitrates, comprising:

a bitstream analyzing portion for decoding gamut bit allocation information for each subband of a base layer, representing the number of bits of quantized data of the respective subbands belonging to the base layer, index representing the presence of data for predetermined frequency components of the quantized data corresponding to the number of bits allocated to the respective subbands, quantization step size and the quantized data, in the generated order of the layers of the bitstreams, decoding being performed by obtaining the number of bits allocated to the subbands belonging to each layer and decoding the quantized data corresponding to the number of allocated bits referring to the index;

an inverse quantizing portion for restoring the decoded quantization step size and quantized data into signals having the original magnitudes; and a frequency/time mapping portion for converting inversely quantized signals into signals of a temporal domain.

21. The scalable audio decoding apparatus according to claim 20, wherein decoding the quantized data in the decoding step is performed from the most significant bit to lower significant bits.

22. A scalable audio coding method for coding audio signals into a layered datastream having a base layer and a predetermined number of enhancement layers, comprising the steps of:

(a) signal-processing input audio signals and quantizing the same for each predetermined coding band;

(b) coding the quantized data of a first range of frequencies corresponding to the base layer within a predetermined layer size;

(c) coding the quantized data of a second range of frequencies corresponding to the next enhancement layer within a predetermined layer size; and (d) sequentially performing the layer coding steps for all layers, wherein the steps (b), (c) and (d) each comprise the steps of:

(i) obtaining gamut bit allocation information representing the number of bits of the quantized data corresponding to the respective subbands belonging to a layer to be coded;

(ii) obtaining the number of bits allocated to the respective subbands within each subband size of the layers;

(iii) generating an index representing the presence of quantized data for predetermined frequency components forming the subbands for the quantized data corresponding to the number of allocated bits; and (iv) generating bitstreams by coding the quantized data corresponding to the gamut bit allocation information, quantization step size, index and number of bits allocated to the respective subbands, by a predetermined coding method.

23. The scalable audio coding method according to claim 22, said second range of frequencies includes frequencies different from said first range of frequencies wherein the most significant digits of the quantized data of said frequencies different from said first range of frequencies are coded before coding next significant digits of the quantized data belonging to the corresponding enhancement layer.

24. The scalable audio coding method according to claim 23, wherein the quantized data corresponding to the number of allocated bits is quantized from the most significant bit to the least significant bit.

25. The scalable audio coding method according to claim 24, wherein coding of the quantized data corresponding to the number of allocated bits is performed in the step (iv) by coupling the quantized data in units of bits of a predetermined number.

26. The scalable audio coding method according to claim 24, wherein the number of allocated bits in the step (ii) is one bit, and the step (iv) is to generate the gamut bit allocation information and index as bitstreams by a predetermined coding method.

27. The scalable audio coding method according to claim 23, wherein the predetermined coding method is lossless coding.

28. The scalable audio coding method according to claim 27, wherein the lossless coding is Hoffman coding.

29. The scalable audio coding method according to claim 27, wherein the lossless coding is Arithmetic coding.

30. The scalable audio coding method according to claim 23, wherein the step (a) comprises the steps of:

converting the input audio signals of a temporal domain into signals of a frequency domain;

coupling the converted signals as signals of predetermined subbands by time/frequency mapping and calculating a masking threshold at each subband; and quantizing the signals for each predetermined coding band so that quantization noise of each band is smaller than the masking threshold.

* * * * *